(12) United States Patent
Muraiti et al.

(10) Patent No.: US 10,035,433 B2
(45) Date of Patent: Jul. 31, 2018

(54) FRAMELESS TRANSIT SEAT

(71) Applicant: FREEDMAN SEATING COMPANY, Chicago, IL (US)

(72) Inventors: Vitaliy Viktorovich Muraiti, River Forest, IL (US); Paul I. Vidri, Chicago, IL (US); David Alan Klopp, Palos Hills, IL (US); Vladislav Balef, Northbrook, IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 14/999,270

(22) Filed: Apr. 15, 2016

(65) Prior Publication Data

US 2017/0297456 A1 Oct. 19, 2017

(51) Int. Cl.
  *B60N 2/01* (2006.01)
  *B60N 2/20* (2006.01)
  *B64D 11/06* (2006.01)

(52) U.S. Cl.
  CPC .......... *B60N 2/01* (2013.01); *B60N 2/20* (2013.01); *B64D 11/0696* (2013.01)

(58) Field of Classification Search
  CPC ....... A47C 1/124; A47C 7/024; A47C 11/005; B60N 2/01; B60N 2/20
  USPC .......................... 297/248, 243, 242
  See application file for complete search history.

(56) References Cited

U.S. PATENT DOCUMENTS

| | | | | |
|---|---|---|---|---|
| D126,998 S | * | 5/1941 | Bersin | 297/248 |
| 2,933,127 A | * | 4/1960 | Brewster | B64D 11/06 244/122 R |
| 3,468,582 A | * | 9/1969 | Judd | B64D 11/06 294/122 |
| 3,619,004 A | * | 11/1971 | McKernan | A47C 1/12 108/48 |
| D250,071 S | * | 10/1978 | Dickerson | D6/356 |
| 4,440,441 A | * | 4/1984 | Marrujo | B60N 2/4221 188/371 |
| 4,526,421 A | * | 7/1985 | Brennan | B64D 11/06 108/51.3 |
| 4,730,872 A | * | 3/1988 | Golzer | A47C 11/00 297/232 |

(Continued)

OTHER PUBLICATIONS

Freedman Seating Co., GO Seat Product Brochure, published Sep. 2011 (2 pages).

(Continued)

*Primary Examiner* — Jose V Chen
(74) *Attorney, Agent, or Firm* — Greenberg Traurig, LLP

(57) ABSTRACT

A frameless transit seat is used for carrying passengers in a transit vehicle. The transit seat is comprised of at least two pedestals which connect the seating portion to the vehicle floor and which distribute the weight of the seat and its passenger(s). Under the passenger, at least two side supports are affixed on top of the pedestals, and one or more crossbars or stabilizers, without any rack frame structures connecting the pedestals. A variant of the transit seat has two seats and uses a mounting plate to connect the two inner side supports to a central pedestal. The components of the transit seat include hollow beams, bent sheet metal, and other components optimized to decrease mass while retaining maximum strength. Optionally, the seat may recline and be upholstered in a variety of covering options.

20 Claims, 14 Drawing Sheets

(56) References Cited

U.S. PATENT DOCUMENTS

| | | | | | |
|---|---|---|---|---|---|
| 4,848,843 | A | * | 7/1989 | Gibbs | A47C 3/00 248/188 |
| 5,409,186 | A | * | 4/1995 | Chow | B64D 11/06 165/41 |
| 5,529,376 | A | * | 6/1996 | Jovan | B60N 2/015 297/188.07 |
| 5,553,923 | A | * | 9/1996 | Bilezikjian | B64D 11/06 297/232 |
| 5,575,533 | A | * | 11/1996 | Glance | B60N 2/682 297/232 |
| 5,597,139 | A | * | 1/1997 | Beroth | B64D 11/0693 244/118.6 |
| 5,800,013 | A | * | 9/1998 | Branham | B60N 2/242 297/232 |
| 7,104,607 | B2 | * | 9/2006 | Yasuda | B60N 2/2222 297/230.1 |
| 7,159,937 | B2 | * | 1/2007 | Williamson | B60N 2/01508 297/216.13 |
| 7,789,460 | B2 | * | 9/2010 | Lamparter | B60N 2/686 297/216.13 |
| 8,336,965 | B2 | * | 12/2012 | Kismarton | B64D 11/06 297/232 |
| 8,888,192 | B2 | * | 11/2014 | Yamamoto | B60N 2/065 297/452.2 |
| 2011/0298252 | A1 | * | 12/2011 | King | A47C 1/121 297/188.14 |
| 2013/0001996 | A1 | * | 1/2013 | Dilsen | B60N 2/3009 297/354.1 |
| 2013/0341985 | A1 | * | 12/2013 | Tsuruta | B60N 2/2356 297/354.1 |

OTHER PUBLICATIONS

Freedman Seating Co., GO-ES Seat Product Brochure, published Oct. 2013 (2 pages).

Freedman Seating Co,, photographs of the interior components of the GO and GO-ES Seats from 2011 and 2013 respectively (5 pages).

* cited by examiner

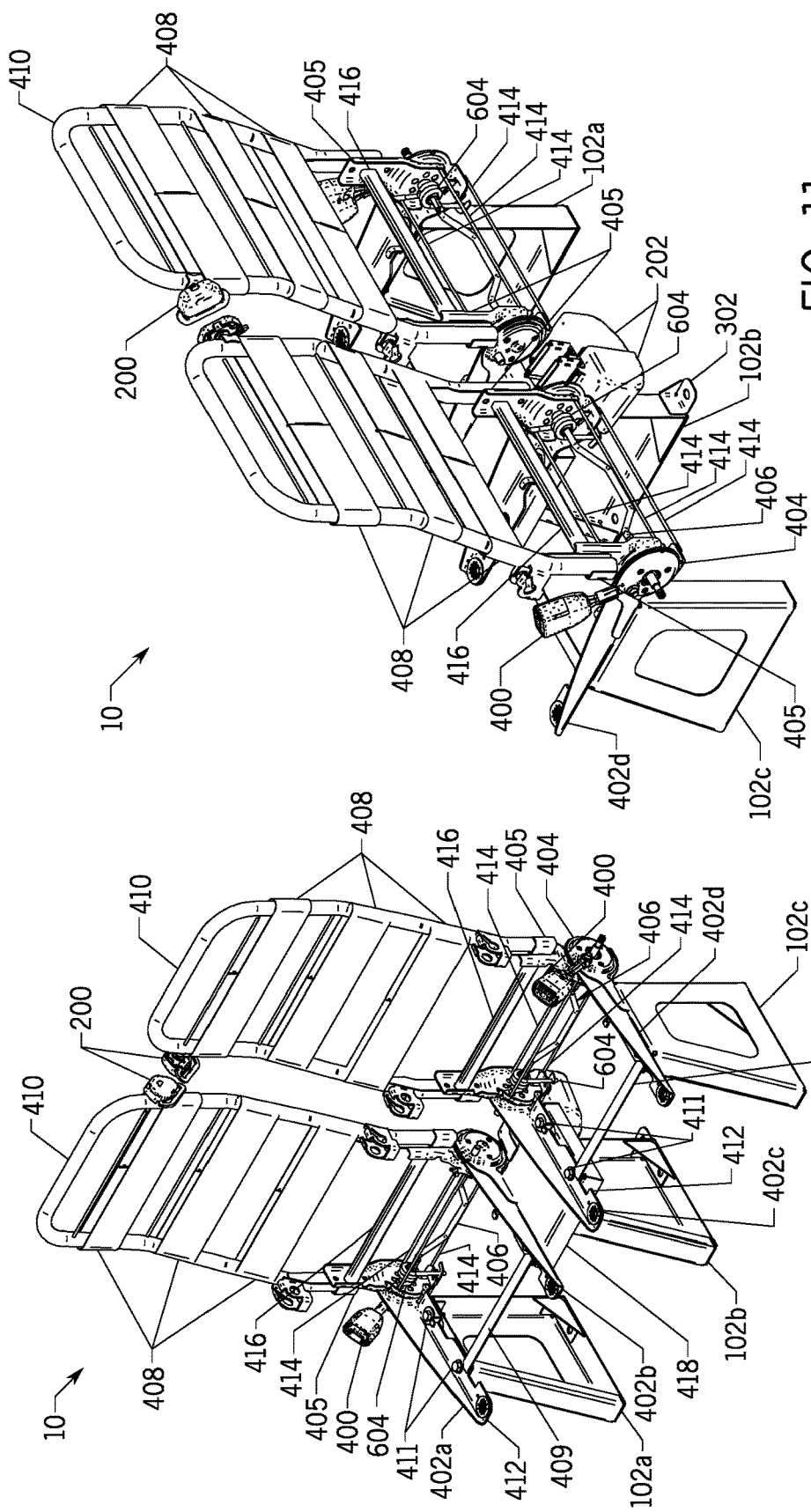

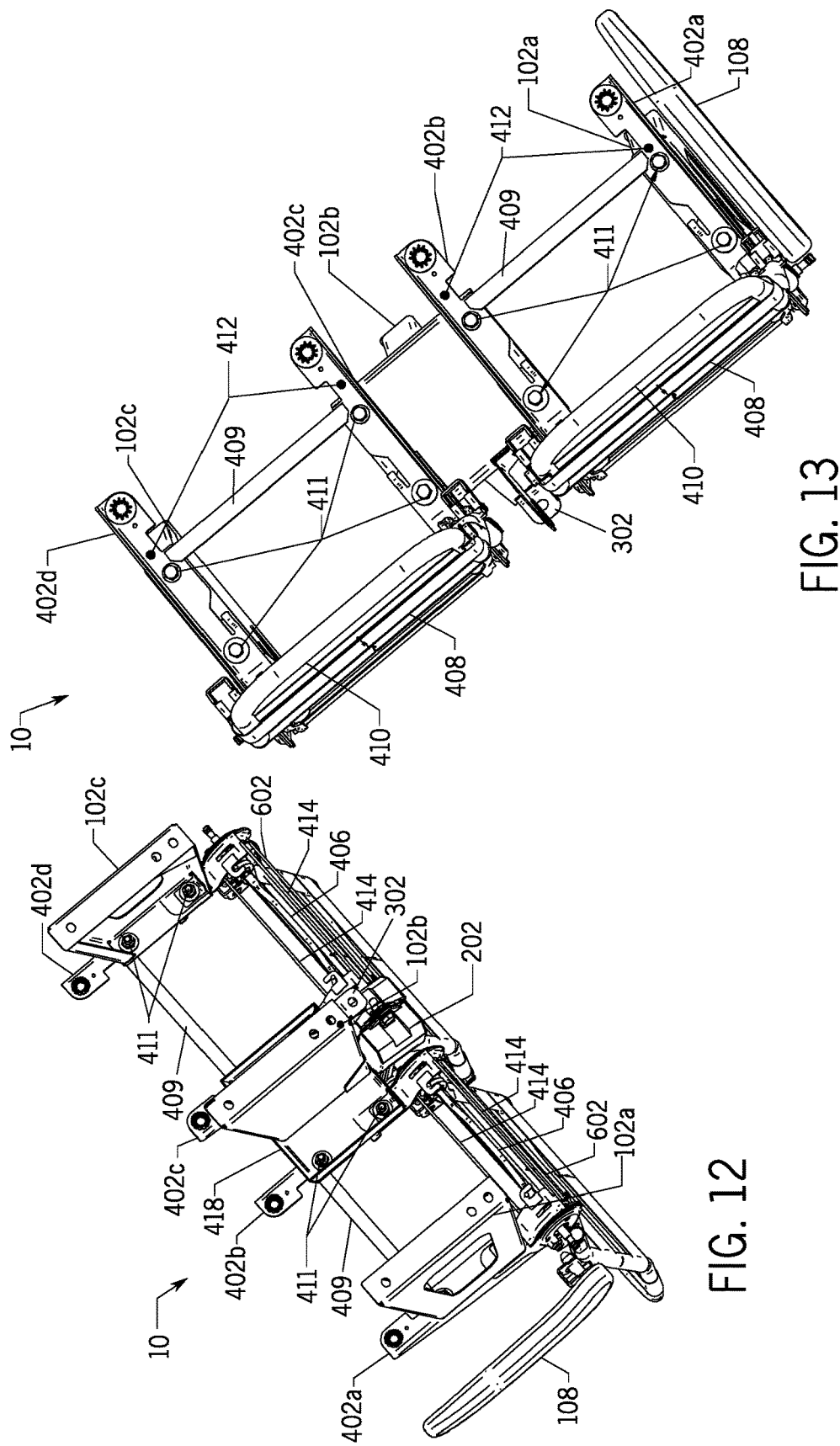

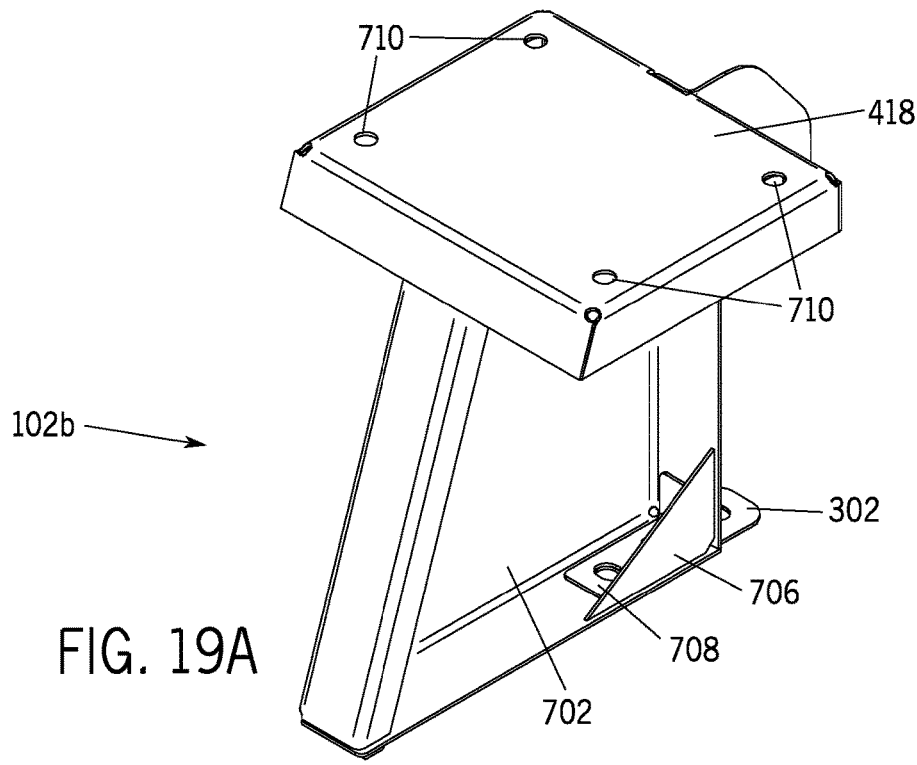
FIG. 19A
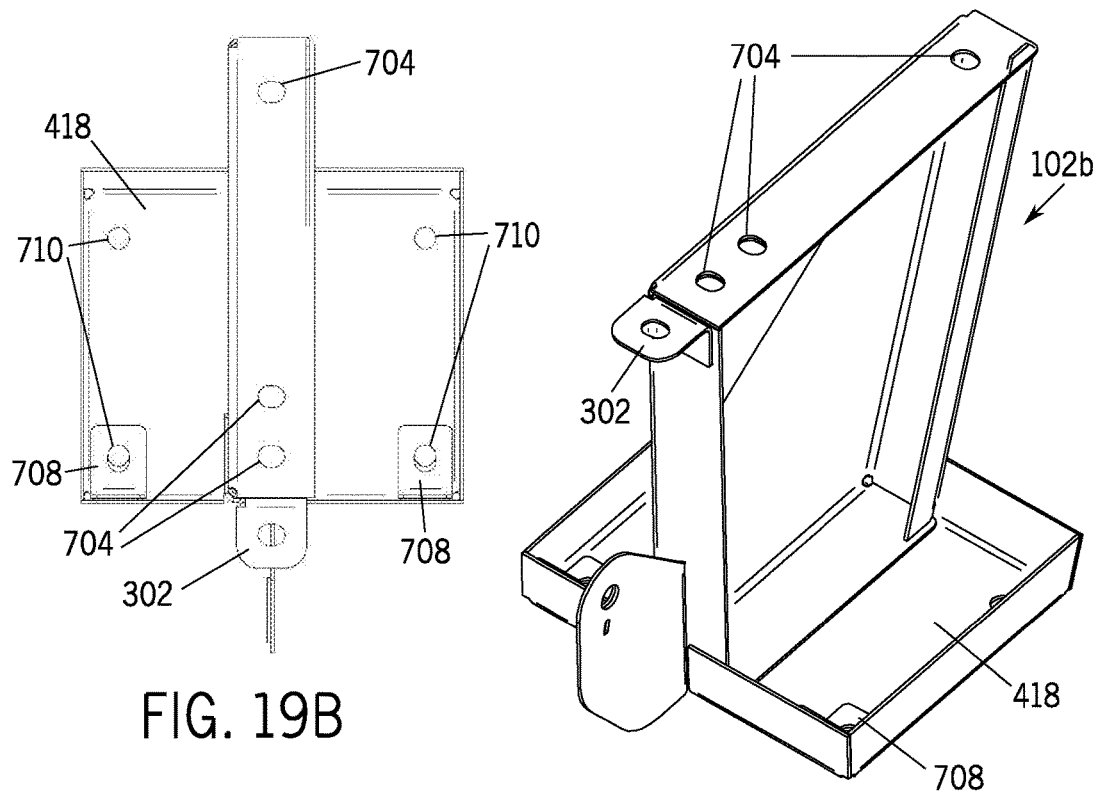
FIG. 19B
FIG. 19C

FRAMELESS TRANSIT SEAT

FIELD OF THE DISCLOSURE

The present invention is directed to a transit seat, and in particular, to a transit seat which more efficiently distributes the weight of both the transit seat itself and the passenger who sits in it, in part by elimination of a frame element.

BACKGROUND OF THE DISCLOSURE

Transit seats are commonly used in vehicles of all shapes and sizes, from passenger vehicles to airplanes. Such seats are typically designed as either bucket-type seats, in which each seating surface comprises a seat for an individual passenger, or as bench-type seats, in which each seating surface comprises a seat for two or more passengers. These seats can be adapted for comfort and utility in a variety of ways. Transit seats can also include amenities such as pockets, electrical outlets, integrated media viewing, separate headrests, seat back trays and the like.

Transit seats are often constructed of heavy frames and supporting members of high-density materials. Most transit seats have significant mass in a heavy frame surrounding the seating portion, the area directly underneath the passenger's weight. The legs of a transit seat, which extend down from the frame to attach the transit seat to the vehicle floor, are often dense and/or heavy. The conventional frame provides stability and support for the passenger, and serves to properly distribute the weight of the passenger and the seat through the legs and along the vehicle floor.

Since such vehicles are intended to move and carry passengers (and cargo), it is desirable to minimize the mass and weight of transit seats, which would decrease the vehicle's overall mass and thereby improve the vehicle's fuel efficiency. In addition, a reduction in transit seat weight could allow vehicle owners and manufacturers to increase cargo or towing capacity without increased fuel consumption. Further, lighter transit seats could be adapted to a wider array of vehicular designs.

SUMMARY OF THE INVENTION

The present invention comprises a frameless transit seat having an adjustable seat back with minimized, reduced mass components positioned immediately below the seating position, without the utilization of one or more conventional rack frame support structures positioned between the forward portions of the side supports. In one embodiment, the transit seat includes two outer pedestals and two side support structures that serve as the primary support for the cushion assembly where the passenger sits. A seat back is positioned at the rear of these side support structures and can optionally rotate. In another embodiment, the transit seat is adapted for two passengers and, as such, additionally includes a common mounting portion and one inner pedestal to support the interior side support structures.

One example of the present invention is a transit seat for a vehicle having a vehicle floor. The transit seat includes at least two pedestals which are affixed to the vehicle floor, a seat back portion, a cushion assembly, and a base. The base includes two or more side supports, each side support being affixed on the top of one of the pedestals, and one or more crossbars or stabilizing bars. The base, including the pedestals, side supports, and one or more crossbars or stabilizing bars, expressly excludes the orientation of one or more conventional rack frame support structures positioned between the forward portions of the side supports.

Another version of the transit seat is forms for two passengers and additionally includes a mounting plate and three pedestals, in which the three pedestals include two outer pedestals supporting the opposing ends of the transit seat, and a third, inner pedestal. The mounting plate is affixed to the third, inner pedestal and coupled to at least two side supports, forming a seat for two passengers. Some transit seats include a reclining mechanism allowing the seat back portion to rotate around a fixed axis relative to the rest of the transit seat which is resiliently biased to return to an upright position. Some variants include a torsion spring. The reclining mechanism can include a locking mechanism that prevents motion of the pivotable connection relative to the pedestals which can be controlled by a handle.

In some versions, transit seats in which the pedestals are structured as trapezoidal housings that are substantially hollow. Some transit seats comprise a bucket-style seat, while others comprise a bench-style seat.

Some versions of the transit seat include a seat belt. The transit seats can include a seat cover. This transit seat can be a plastic shell shaped to hold the user. In other seats, the seat cover comprises a fabric cover that is stretched over foam padding.

In another example, the transit seat is a single seat that includes a first pedestal positioned at one end of the transit seat and a second pedestal positioned at the opposite end of the transit seat; a cushion assembly; a seat back portion including a seat cover and foam padding; and a seat base. This base includes one or more crossbars; a stabilizing bar; a first side support affixed on top of the first pedestal; and a second side support affixed on top of the second pedestal. The base expressly excludes the orientation of a rack frame support structure operably positioned between the forward portions of the side supports. In some versions, the transit seat has a reclining mechanism allowing the seat back portion to rotate around a fixed axis at the rear of the first and second side supports. In other versions, the seat back portion of the transit seat is fixed and unable to rotate relative to the first and second side supports.

In another example, the transit seat is a dual seat that includes a first pedestal positioned at one end of the transit seat; a second pedestal positioned at the opposite end of the transit seat; a third pedestal positioned in the center of the transit seat; a cushion assembly; a seat back portion including a seat cover and foam padding; and a seat base. This base includes one or more crossbars; a stabilizing bar; a first side support affixed on top of the first pedestal; a second side support affixed on top of the second pedestal; and a third side support and a fourth side support. The third side support and the fourth side support are affixed on top of a mounting plate. The mounting plate is affixed on top of the third pedestal. The base expressly excludes the orientation of a conventional rack frame support structure operably positioned between the forward portions of the side supports. In some versions, the transit seat has a reclining mechanism allowing the seat back portion to rotate around a fixed axis at the rear of the first and second side supports. In other versions, the seat back portion of the transit seat is fixed and unable to rotate relative to the first and second side supports.

BRIEF DESCRIPTION OF THE DRAWINGS

FIG. 10 is a front perspective view of the inventive transit seat of FIG. 3A, adapted for two passengers, from which the seat assemblies have been removed, showing the various seat support components replacing a standard conventional seat frame;

FIG. 11 a rear perspective view of the transit seat of FIG. 10;

FIG. 12 is a bottom perspective view of the transit seat of FIG. 10;

FIG. 13 is a top perspective view of the transit seat of FIG. 10;

FIG. 19A is a top perspective view of the inner pedestal of FIG. 10 integrated to the mounting plate;

FIG. 19B is a bottom plan view of the pedestal-mounting plate assembly of FIG. 19A;

FIG. 19C is a bottom perspective of the pedestal-mounting plate assembly of FIG. 19A;

DETAILED DESCRIPTION OF THE INVENTION

Figure 1A:
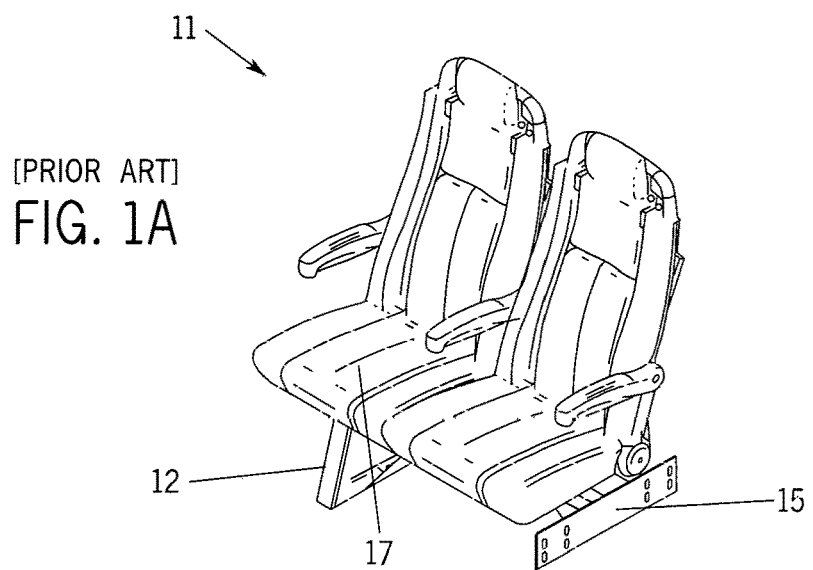
FIG. 1A is a perspective view of a prior art transit seat.

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details. Thus, while the invention is susceptible to embodiment in many different forms, the subsequent description of the present disclosure should be considered as an exemplification of the principles of the invention, and is not intended to limit the invention to the embodiments so illustrated.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to the various embodiments shown and described in this specification.

For the purposes of this detailed description, it is envisioned that in one example of the invention, transit seat 10 will be installed into a vehicle. A person will board the vehicle and sit in transit seat 10. While sitting in transit seat 10 on seating portion 104a they will fasten their seat belt. During travel, the user will recline seat back portion 106a by reaching to the side of transit seat 10 to release a locking mechanism with a handle. This description is not meant to limit the scope of the claims, but rather to describe one embodiment of the invention.

Figure 1B:
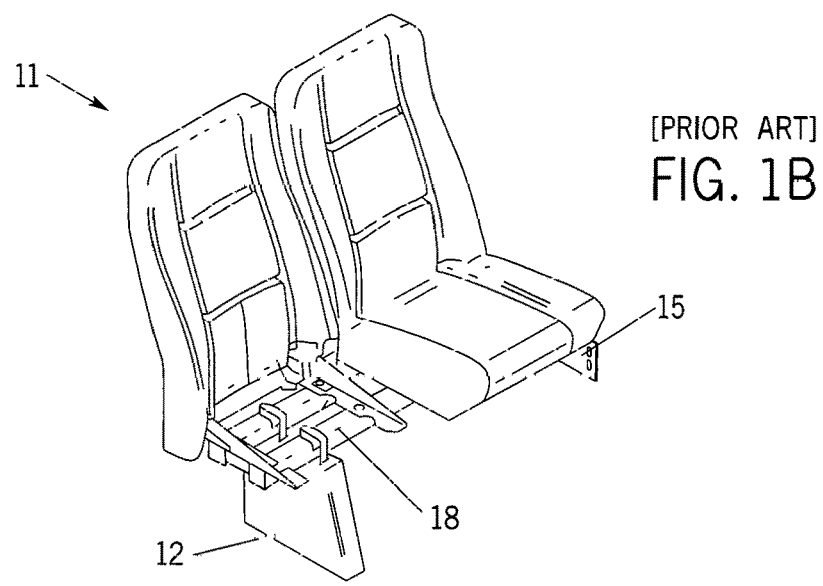
FIG. 1B is another perspective view of the prior art transit seat of FIG. 1, with a cushion assembly removed to reveal a rectangular frame.
Figure 1C:
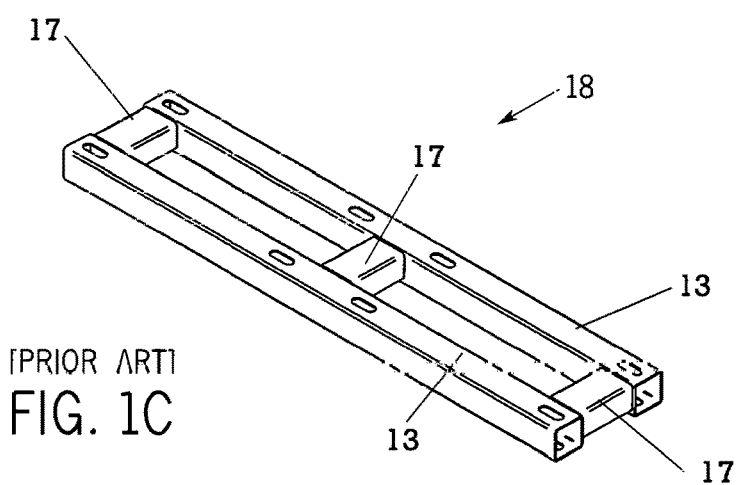
FIG. 1C is a perspective view of one conventional rectangular frame element within the prior art transit seat of FIG. 2.

A prior art seat 11 is shown in FIG. 1A. This prior art seat 11 has been made by Freedman Seating Company under the name GO Seat for several years. Prior art seat 11 includes leg 12, an attachment to a vehicle floor, and wall mount 15 attached to the wall of the vehicle. As shown in FIG. 1B, under seat cushion 17, prior art seat 11 includes rectangular rack frame 18 which connects leg 12 and wall mount 15 and provides rigidity and support for the weight of the passenger. FIG. 1B shows the same prior art seat 11 without seat cushion 17 to expose rectangular rack frame 18 which is connected to leg 12 and wall mount 15 and which supports the weight of the passenger. Rectangular rack frame 18, shown alone in FIG. 1C, was typically constructed of two thick structural tubes of heavy materials such as steel. Leg 12 was mounted at any place along rectangular rack frame 18.

Conventionally, rectangular rack frame 18 is comprised of substantial elements of large cross sections to support and distribute the weight of the passenger. These elements include at least two large beams 13 and a plurality of transverse members 17. These beams 13 are made of thick, heavy, and large parts to provide stability and safety with similarly substantial transverse members 17 providing linkages between the beams 13. These massive frame support structures, such as rectangular rack frame 18, are needed to pass a variety of governmental safety tests. Both beams 13 and transverse members 17 are conventionally designed with large heights and widths more than 0.5". These elements of rectangular rack frame 18 are generally made with hollow steel round or bar tubing or similarly strong and dense materials.

Figure 2:
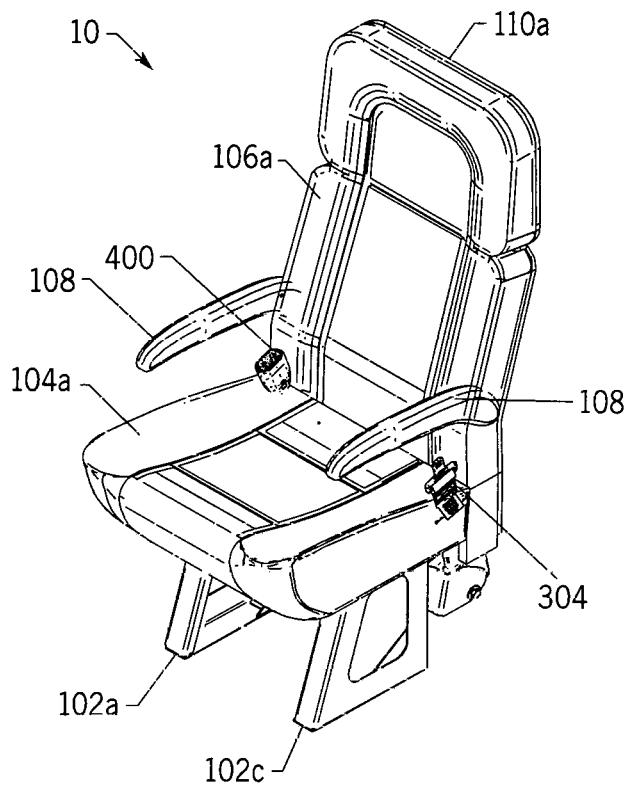
FIG. 2 is a perspective view of the inventive transit seat adapted for one passenger with the seat cushions and assemblies fully integrated, according to a preferred embodiment of the invention.

A single seat version of transit seat 10 of the present invention is shown in a perspective view in FIG. 2. Transit seat 10 generally comprises seating portion 104a, the section of the transit seat 10 in which a passenger actually sits, and seat back portion 106a, the upper section of the transit seat 10 against which a passenger leans back when seated in transit seat 10. The weight of seating portion 104a is supported by a plurality of pedestals, including outer pedestals 102a and 102c and one inner pedestal 102b, which are vertical support structures that are affixed to both seating portions 104a and 104b respectively as well as to the vehicle floor. The outer pedestals are placed at the respective sides of seating portion 104a, as shown in FIG. 2, relative to pedestals 102a and 102c to create the strongest load path.

Figure 3A:
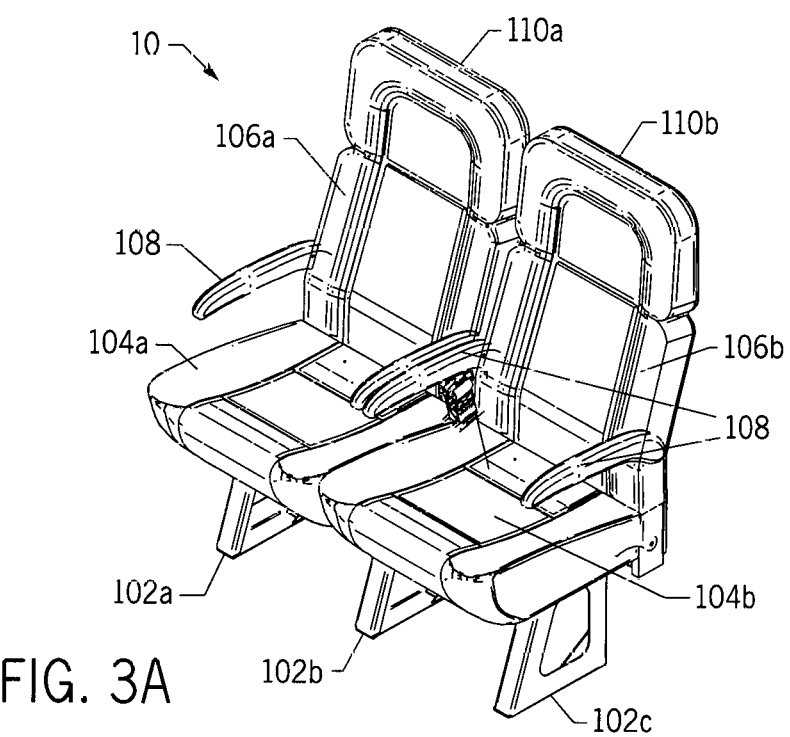
FIG. 3A is a perspective view of the inventive transit seat adapted for two passengers with the seat cushions and assemblies fully integrated, according to another preferred embodiment of the invention.

A double seat version of transit seat 10 is shown in FIG. 3A. A second seating portion 104b and seat back 106b is added. Both seating portions 104a and 104b share inner pedestal 102b between the two seats. The weight of the assembly and passengers is distributed to inner pedestal 102b by means of mounting plate 418 which in turn is connected at both seating portions 104a and 104b which can be seen in the front view in FIG. 3B. One of ordinary skill in the art would appreciate that inner pedestal 102b could be positioned in a range of locations to bear the weight of the passenger.

Figure 3B:
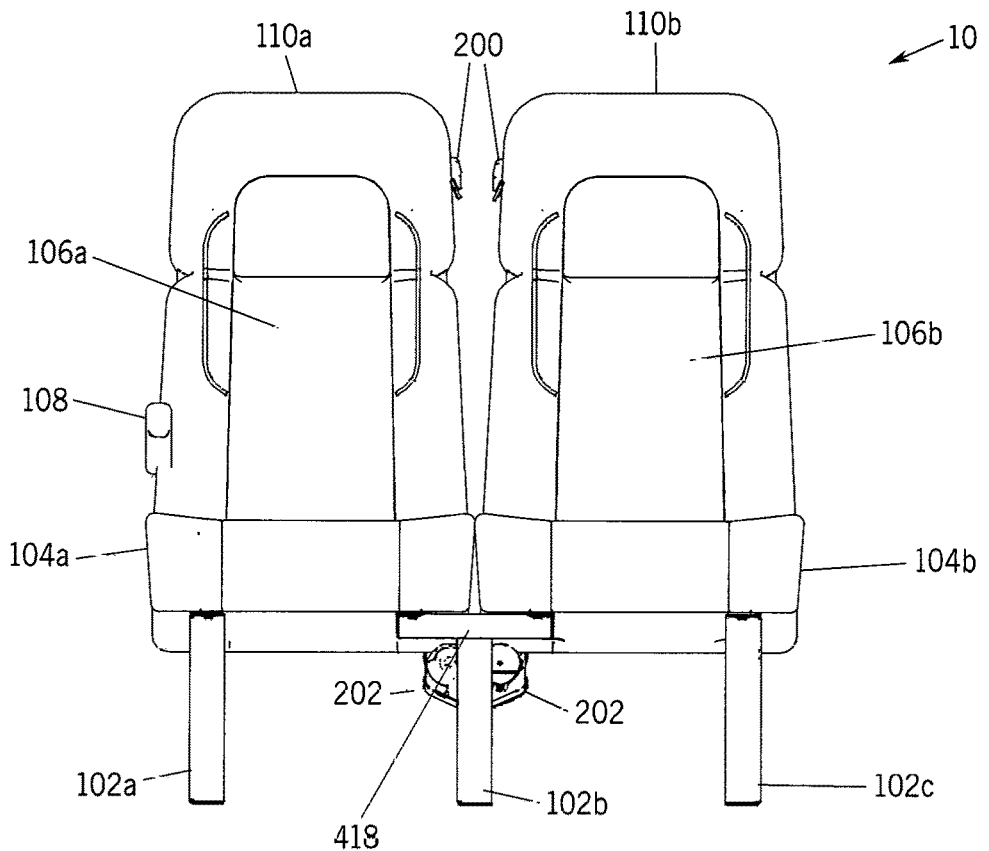
FIG. 3B is an elevated front view of the transit seat of FIG. 3A.
Figure 3C:
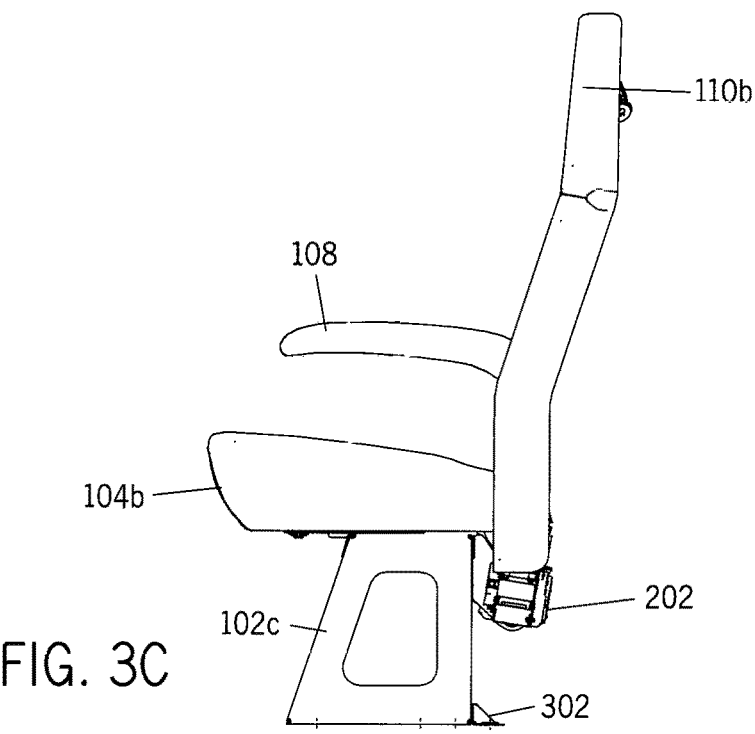
FIG. 3C is an elevated side view of the transit seat of FIG. 3A.

In the side view of FIG. 3C of the double seat version of transit seat 10, floor bracket 302 cooperates with inner pedestal 102b. Floor bracket 302 is a support structure that serves to reinforce the affixation of at least one of the pedestals, such as here, inner pedestal 102b, to the vehicle floor. Floor bracket 302 provides additional stability to the seat by serving as an additional point of contact and attachment between inner pedestal 102b and the vehicle floor.

Seat back portion 106a and 106b extends substantially vertically from the rear of each of seating portion 104. When passengers sit in transit seat 10, seat back portion 106a and 106b provides support to enable the passengers to lean backwards. Seat back portions 106a and 106b are adapted to support a passenger's back. In some versions of transit seat 10, the seat backs 106a and 106b recline. In these versions, seat back portions 106a and 106b are pivotably connected to the rest of transit seat 10, as described below in the context of FIGS. 16A-B.

Transit seat 10 may also be outfitted with one or more armrests 108 as shown in FIG. 2-3C, which may be pivotably mounted or statically coupled to seat back portions 106a and 106b, according to known techniques. Specifically, armrest 108 may be pivotably mounted such that it can rotate 90 degrees—between a first position, where armrest 108 is stowed alongside seat back portions 106a and 106b, and a second position, where armrest 108 is deployed to enable it to support a passenger's arm, as shown in FIGS. 2-3C. Armrest 108 can also be shaped as a simple rectangular cantilever, made to fit ergonomically to the passenger, or otherwise adapted to the type and function of the vehicle to fit a customer's needs. Armrest 108 can be made of plastic, wood, or any other suitable material. In other examples not shown herein, it may also be connected to the seating portions 104a and 104b simultaneously or exclusively.

In FIG. 2, a belt 304 and female buckle 400 of a conventional lap belt buckling mechanism are shown. In FIG. 3B, Sash guide 200 is the top portion of a conventional three-point seat belt system. Retractor 202 comprises a conventional mechanism that spools the excess slack in belt 304 in either configuration. In a two-point arrangement as shown in FIG. 2, belt 304 emanates from retractor 202, extends to enable the passenger to secure belt 304 across their belt into female buckle 400. While the example shown in FIGS. 2 and 3A demonstrate a two-point seat belt arrangement, one of ordinary skill in the art would recognize that these same components of the restraining device could be arranged to create a three-point seat belt configuration using sash guide 202, a five-point harness belt configuration, or any other suitable arrangement. One of ordinary skill in the art will also appreciate that the restraining device could also comprise a relatively shorter belt 304 of fixed length, rather than a longer belt 304 wrapped or coiled within retractor 202, or any other suitable device for keeping the passenger in his or her seat during a collision.

In FIGS. 2-3C, transit seat 10 is shown as a finished product upon which a passenger would sit with cushion assemblies 902 (see FIGS. 19-20) and seat covers 110a and 110b installed. The specific structure of cushion assemblies 902, is shown and described in FIGS. 20A-B. Seat covers 110a and 110b can take many different shapes and sizes. In some examples, seat covers 110a and 110b can be shaped to create a bucket-style seat for an individual passenger as shown in FIGS. 2 and 3. Seat covers 110a and 110b can be made of a hardened plastic material, or from natural or artificial fabrics in the nature of upholstery, or any otherwise suitable substance. In the examples shown in FIGS. 2-3A, seat covers 110a and 110b are made of fabric that is stretched and hooked onto rods 414 (FIG. 14) within the seat back portions 106a and 106b (FIG. 3A) to provide definition. In the examples shown in FIGS. 2-3A, this fabric is fitted over foam padding (FIG. 4).

Figure 4:
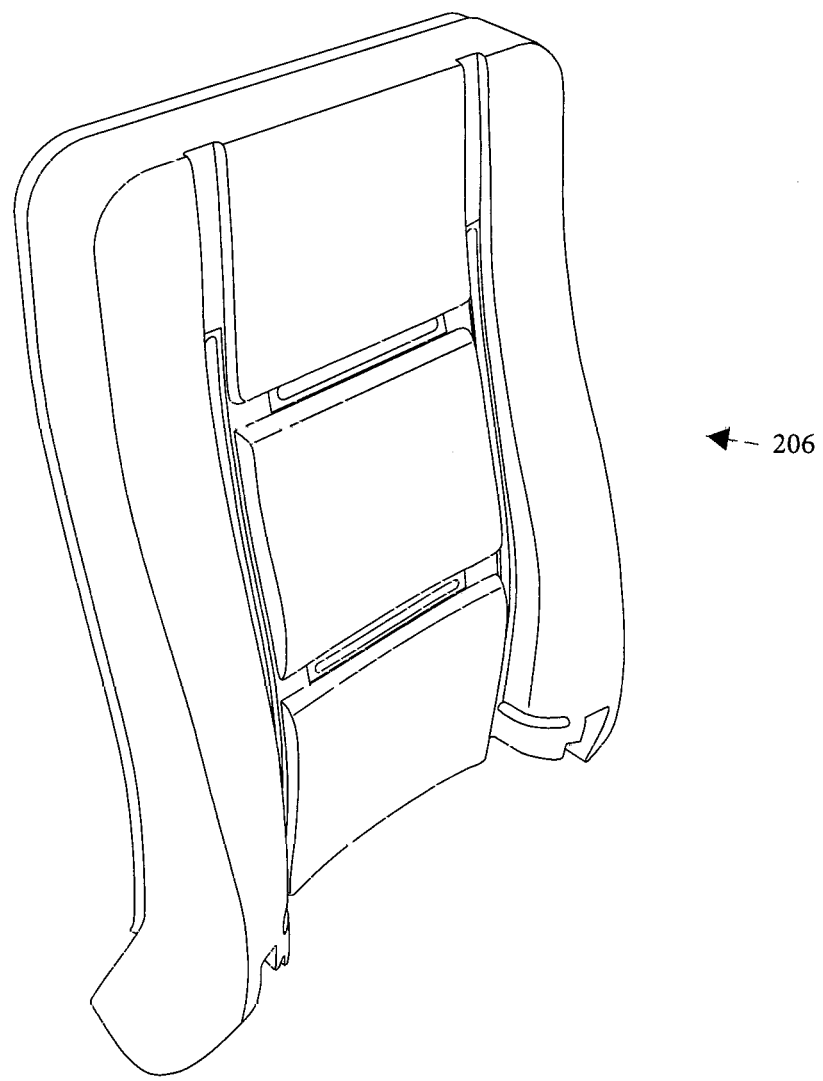
FIG. 4 is a view of the padding under the seat cover of the back of the transit seat of FIG. 2.

Under the covers, FIG. 4 is a view of the padding 206 under the seat cover of the back of the transit seat 10 (FIG.

Figure 5:
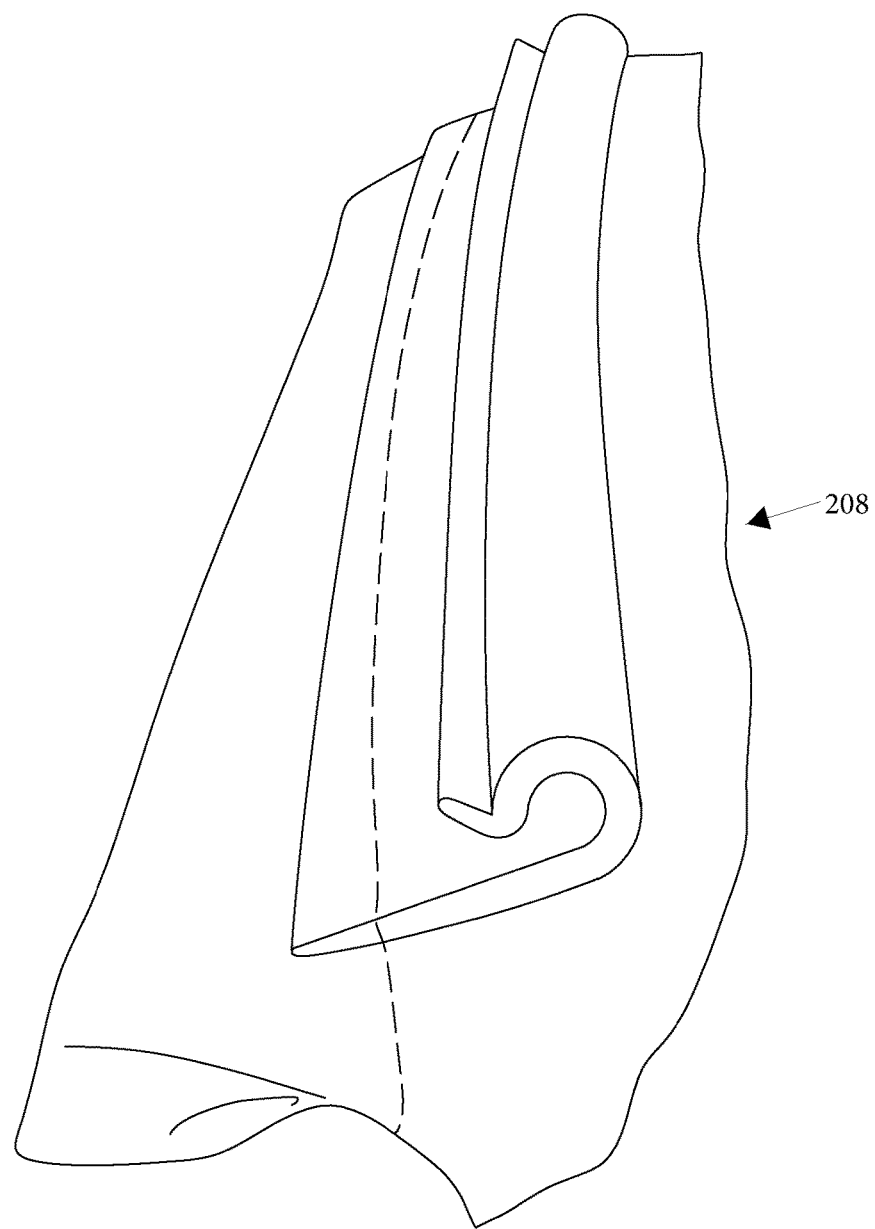
FIG. 5 is a perspective view of a clip for attaching a cover to the transit seat of FIG. 2.

2). In the example shown, padding 206 can is glued into is glued to internal components of seat back portions 106a and 106b to give the seat definition. One of ordinary skill in the art would recognize that the foam could also be molded into the seat back or any other resilient material could be used to comfortably support the passenger. The fabric of seat cover 110a (FIG. 2) is held around corresponding portions of the transit seat 10 with clip 208, shown in FIG. 5, to tighten the fabric down as desired. In the example shown, clip 208 is a pull down or j-clip.

Figure 6:
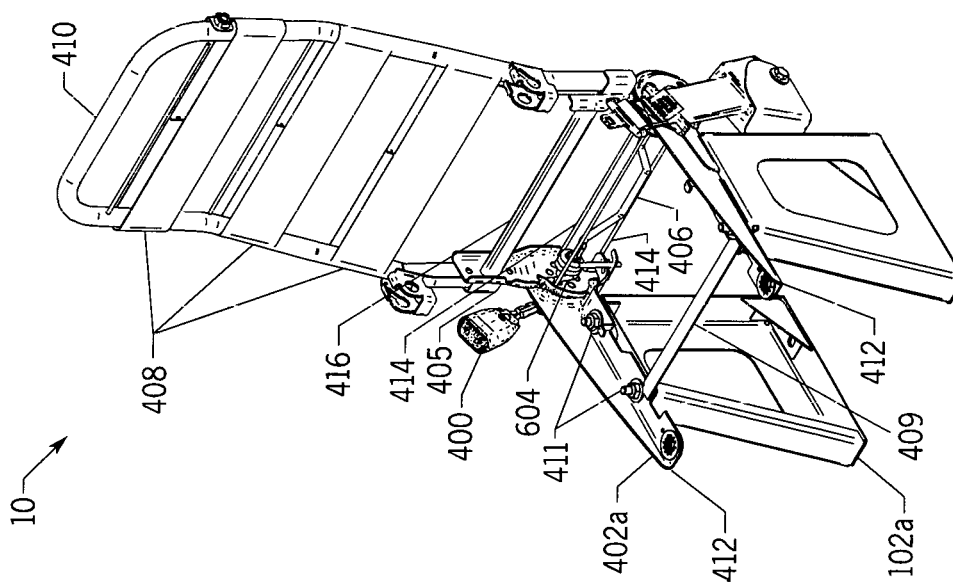
FIG. 6 is a perspective view of the inventive transit seat of FIG. 2 adapted for a single passenger, from which the seat assemblies have been removed, showing the various seat support components replacing a standard seat frame.

FIGS. 6-9 show a single seat version of transit seat 10 without seat covers 110, padding 206, and cushion assemblies 902, to thereby illustrate the internal structures of transit seat 10. A double seat version is shown in FIGS. 10-13 similarly without any exterior components. As shown in FIG. 10, each pedestal 102a, 102b, and 102c is affixed respectively to one or more support structures, such as here, side supports 402a, 402b, 402c, and 402d, which form the "base" on which the passenger sits. In conventional transit seats, the "base" typically comprises a heavy, rectangular rack frame 18, upon which seating portions 104a and 104b would rest (see FIG. 2). In transit seat 10 of the present invention as shown in FIG. 10, no such frame is utilized, relying instead on pedestals 102a, 102b, and 102c, side supports, 402a, 402b, 402c, and 402d, and stabilizing bar 409, to evenly distribute the weight of the overall seat structure and of the passenger sitting therein. Side supports 402a, 402b, 402c, and 402d are rigid structures, shown in this example as a piece of flanged metal structure, but one of ordinary skill would appreciate that it could be constructed of any shape and of any rigid material that could approximately bear and distribute the passenger's weight. Side supports 402a, 402b, 402c, and 402d also serve as a point of attachment for cushion assemblies and distribute the weight of the passenger to pedestals 102a, 102b, and 102c and down to the vehicle floor. Although a double seat has been described, side supports 402a and 402b can form a single seat as shown in FIG. 6, distributing the weight of a single passenger to pedestals 102a and 102c.

In search of a simple seat embodiment such as the single seat shown in FIG. 6, seat back struts 405 are connected by crossbars, such as seat back bar 416. Rods 414 are rigid structures used to secure cover 110a. Seat back bar 416 provides lateral support and stability to the seat back structure 410, but is hollow with a larger diameter than rod 414, to provide support across the full width of seat back structure 410. Also shown in FIG. 6, is stabilizing bar 409.

At the front portion of side supports 402a and 402b, stabilizing bar 409 is affixed primarily to prevent lateral movement in a crash scenario. Side supports 402a and 402b still bear and distribute the majority of the weight of the passenger. Stabilizing bar 409 is a thin piece connected to both side supports 402a and 402b. Unlike the rectangular rack frame 18 (FIG. 1C), stabilizing bar 409 is only a single member with a small cross-sectional area, in one example flat bar stock as small as 0.5" by 0.125". In the example shown in FIG. 6, stabilizing bar 409 is not interposed between side supports 402a and 402b and the pedestals 102a and 102c, which adds less extra mass to transit seat 10 and allows those parts to be directly affixed to each other.

Notably, unlike most conventional transit seats, transit seat 10, as shown in either the double seat configuration in FIGS. 10-13 or the single seat configuration in FIGS. 6-9, does not utilize a heavy seat frame to form the seat base. Rather, the seat base in transit seat 10 shown in FIG. 6 relies mostly on side supports 402a and 402b—without any type of heavy frame support, such as rectangular rack frame 18, that is typically present in conventional transit seats like prior art seat 11 in FIG. 1. As noted above, such prior art seats 11 often utilize thick and heavy components in order to meet and qualify for governmental safety regulations and/or customer design specifications. In the present invention, shown in FIGS. 6 and 10, the inner components, particularly side supports 402a and 402b form a solid, stable, weight-bearing and weight-distributing structure, while reducing the total material usage and the weight of transit seat 10. The components of transit seat 10 may include hollow bars or rods, bent sheet metal, and other optimized components to decrease mass while providing maximum strength and stability. Seat cover 110a (FIG. 2) can be selected from a semi-rigid material to further increase the lateral support imparted to transit seat 10.

In the example shown in FIG. 6, the lightweight components of a single transit seat 10 are arranged to maximize support along the sides of seating portion 104a. In this example, the vertical support of the passenger's weight is distributed through a seat base formed from side supports 402a and 402b to the pedestals 102a and 102c without any other support structure across either the front or back of seating portion 104a (FIG. 2). Lateral support is also provided by the rigidity of stabilizing bar 409 and seat back bar 416.

As seen in FIGS. 6-9, the interior components of transit seat 10 include the seat base (itself, formed by side supports 402a and 402b), which forms symmetrical rigid sides on the right and left side of each passenger at seating portion 104a (FIG. 2), which symmetrical rigid sides can bear the weight of that passenger, translating that support through pedestals 102a and 102c and onto the vehicle floor. Each of side supports 402a and 402b may also comprise support reinforcement plate 412, which is a metal bracket that further increases the rigidity of side support 402 by adding thickness and stability thereto. In the example shown in FIG. 6, support reinforcement plate 412 is positioned from the forward edge of side supports 402a or 402b, and includes apertures through which fasteners 411 are used to affix support reinforcement plate 412 to side supports 402a and 402b, to thereby enhance the rigidity and support provided by side supports 402a and 402b.

Figure 14:
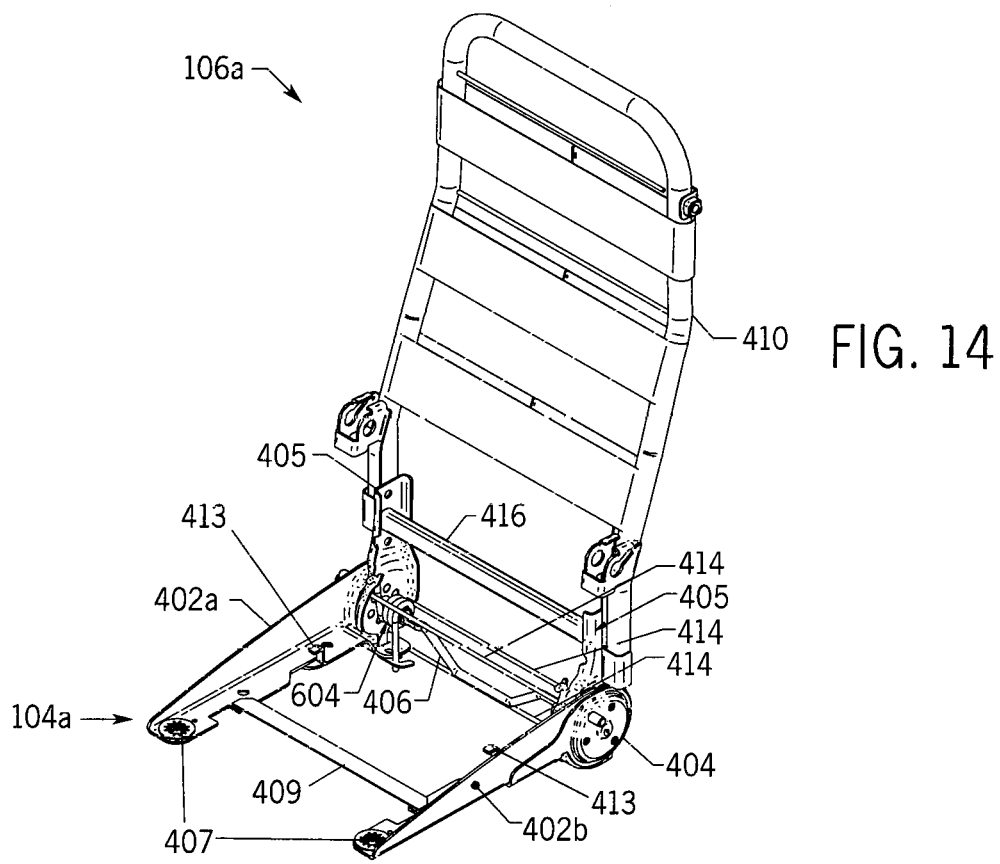
FIG. 14 is a front perspective view of the structural components of the individual seat portions of both FIG. 6 and FIG. 10, showing both the side supports, the seat back structure, and the stabilizing bar.

Side supports 402a and 402b can be affixed to pedestals 102a and 102c and seat cover 110a (FIG. 2) with any sort of attachment, including mechanical fasteners, chemical adhesives, or non-mechanical, non-chemical connectors, such as welding. For efficiency, support reinforcement plate 412 may be affixed to side supports 402a and 402b using fasteners 411 which may also extend downward through side supports 402a and 402b to pedestals 102a and 102c, thereby connecting support reinforcement plate 412 directly to pedestal 102a and 102c. Side supports 402a and 402b can connect to cushion assembly 902 (FIG. 20). Cushion receiving aperture 407 and hook 413 are used to lock cushion assembly 902 into place as shown in FIG. 14.

As shown in FIGS. 6-9, the rearward portion of side support 402 extends backward to form hub 404. Between hub 404 and seat back strut 405 is a conventional reclining mechanism. To enable such reclining, a handle (not shown) can be coupled to handle shaft 600, shown in FIG. 7, to allow the user to control the angle of seat back portion 106 relative to seat portion 104. Hub 404 and the reclining mechanism are shown in detail in FIGS. 16A-16B.

Figure 15:
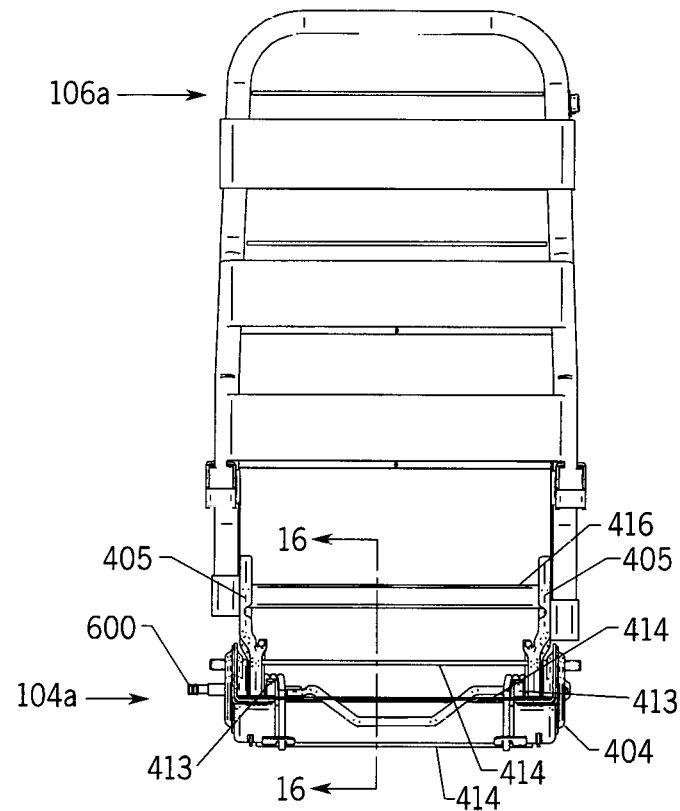
FIG. 15 is an elevated front view of the structural components shown in FIG. 11.

Also shown in FIG. 6, seat back portion 106a is comprised of seat back support 408, seat back structure 410, and seat back struts 405, which provide support for the passenger's back and structure for seat cover 110a (FIG. 2). In the example shown, seat back support 408 span the width of seat back structure 410. Further details about seat back support 408 and seat back structure 410 is shown in FIGS. 14-15 and described below in relation to those figures.

Figure 7:
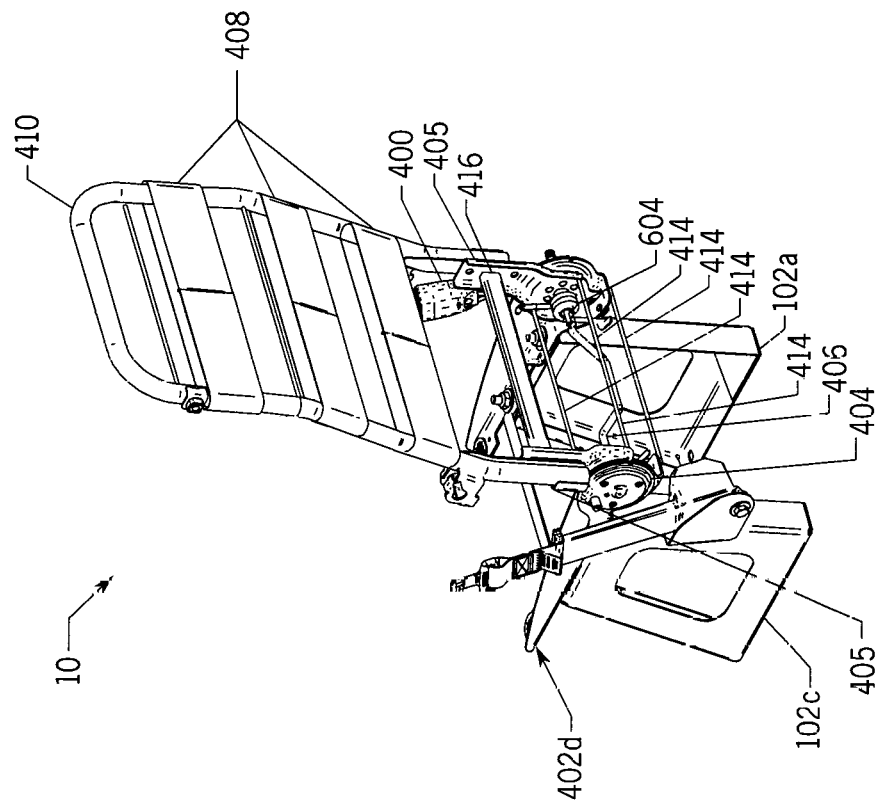
FIG. 7 is a rear perspective view of the transit seat of FIG. 6.

In FIG. 7, spring 604 resiliently biases the motion of seat back strut 405 relative to hub 404 which allows the seat to return automatically to a default position. This default position is chosen by setting the equilibrium point of the spring at the desired angle of seat back strut 405 and side support 402a and 402b. In the example shown best in FIG. 7, spring 604 is a torsion spring. This rotation could be controlled by any kind of spring including a compression, tension, spiral, or leaf spring or any other resiliently-biased mechanism. Coupled to hub 404 are several spring attachment points 800 as shown and described in FIGS. 16A-16B.

Figure 9:
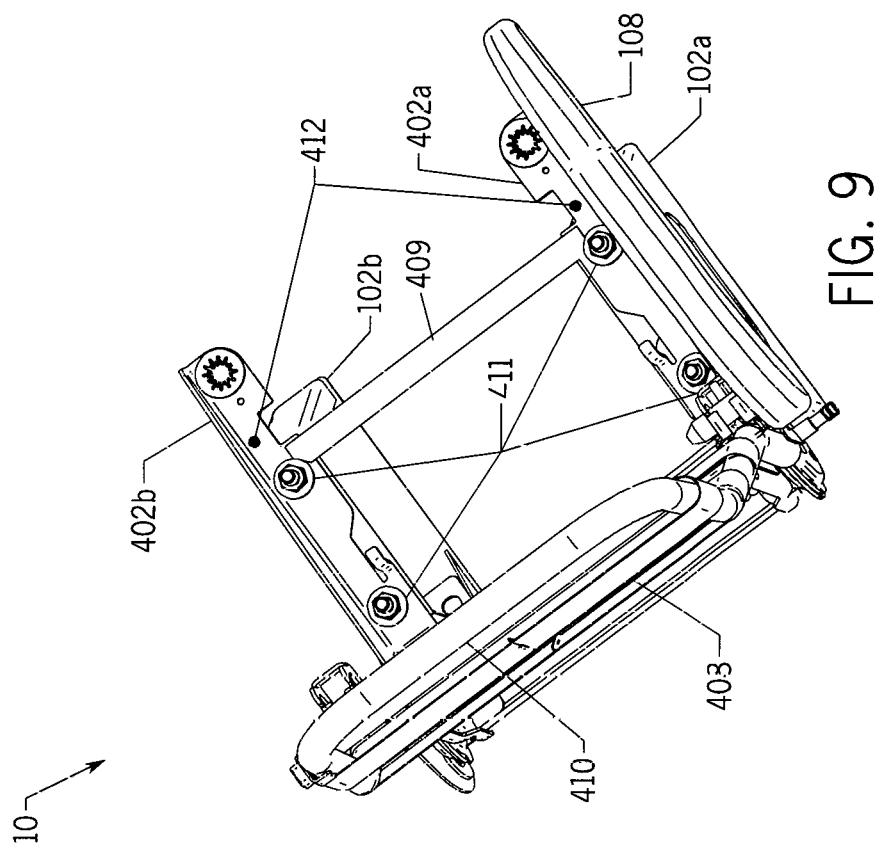
FIG. 9 is a top perspective view of the transit seat of FIG. 6.
Figure 8:
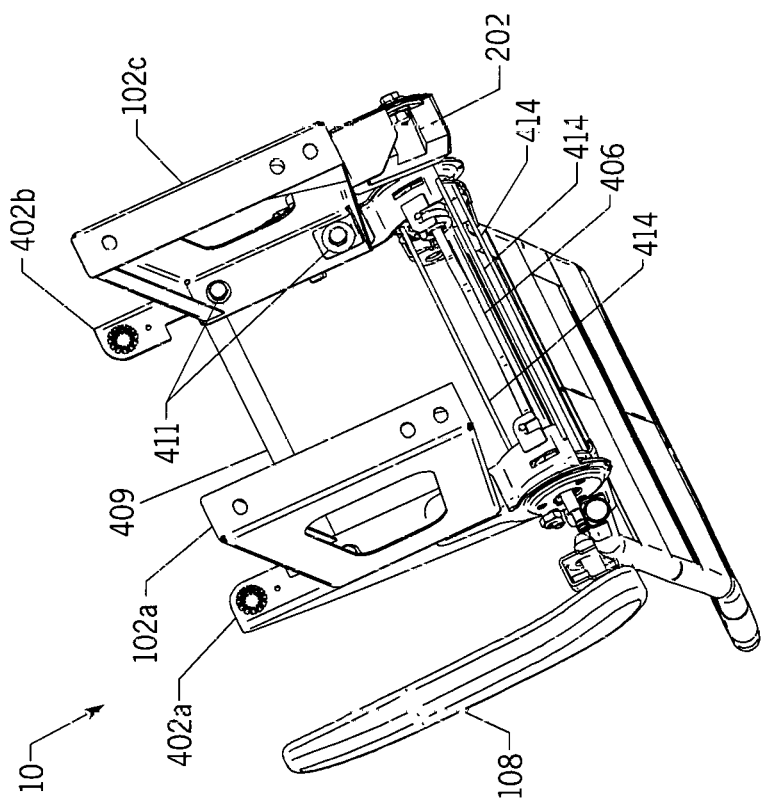
FIG. 8 is a bottom perspective view of the transit seat of FIG. 6.

FIG. 8 shows transit seat 10 from the underside and highlights the other side of fasteners 411 not seen in FIG. 9. In FIG. 9, transit seat 10 is shown from above. These views highlights the attachment of the side supports 402 to their respective pedestals 102a and 102c. In the example shown, side supports 402a and 402d are directly connected to pedestals 102a and 102c respectively using fasteners 411.

As shown in FIG. 10, multiple transit seats for multiple passengers can be combined in one transit seat. FIGS. 10-13 show the two seat configuration in the parallel views of the single seat views FIGS. 6-9 featuring the parts mentioned above. FIG. 10 shows a perspective view of the front of the double seat configuration. FIG. 11 shows transit seat 10 from the rear. FIG. 12 shows transit seat 10 from below. FIG. 13 shows transit seat 10 from above.

In FIG. 10 where transit seat 10 includes two passenger seats, weight-supporting interior side supports 402b and 402c are reinforced with mounting plate 418 operably and fixedly attached to the top of inner pedestal 102b, preferably by a suitable weld, mechanical bolt, or other suitable means. Mounting plate 418 is a linking structure that connects two side supports 402b and 402c to a single pedestal 102b. In this version, the exterior pedestals 102a and 102c are unchanged, and the side supports 402a and 402d are affixed to each respectively as in the singe seat version shown in FIG. 6. Mounting plate 418 specifically supports the bottom of each interior side support 402b and 402c. Side supports 402b and 402c are affixed to mounting plate 418 using fasteners 411 as seen in FIGS. 12-13. This shared, inner pedestal 102b can also be bolstered with floor bracket 302 (FIG. 3C) for additional stability. Mounting plate 418 and inner pedestal 102b are shown and described in FIGS. 19A-C.

FIG. 14 is a perspective view of seat back portion 106a and seating portion 104a, without mounting plate 418 or pedestals 102a, 102b, and 102c affixed, to thereby show seat back structure 410 and the crossbars in greater detail. FIG. 15 shows this same set of parts from a front view. Seat back portion 106a could be formed in a variety of configurations, including having seat back support 408 also integrally formed into seat back structure 410, or a solid plastic combination of seat back portion 106a and seat cover 110a (FIG. 2) shaped to ergonomically support the passenger.

In the example shown in FIGS. 14-15, seat back structure 410 is a system of thin supporting elements like a hollow tubular metal skeleton. It will be appreciated that seat back structure 410 could be of any shape to support seat back portion 106a. This includes configurations that are solid or integrally formed with seat cover 110 (FIG. 2). Seat back support 408 can include any structure providing lateral support to seat back structure 410 across the whole of seat back portion 106a. In the example shown, seat back support 408 comprise bands that are stretched around seat back structure 410, formed of polyester, polypropylene, or any other suitable plastic.

Figure 16A:
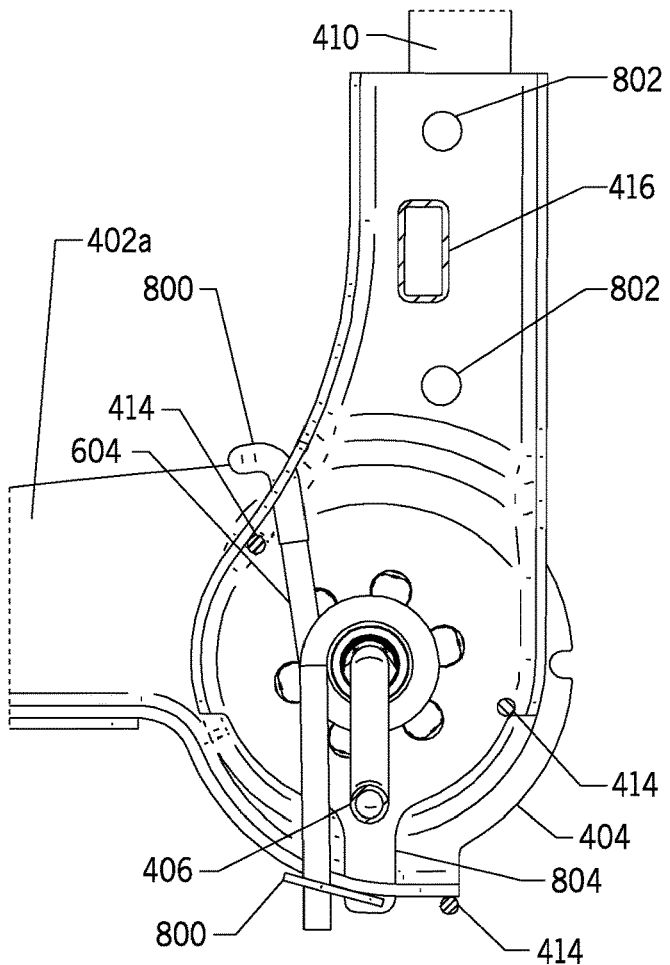
FIG. 16A is an elevated cross-sectional view of the reclining mechanism according to FIG. 15, taken along line 16-16 of that FIG. 15 and looking in the direction of the arrows.

FIG. 16A is a cross-sectional view through section 16-16 of FIG. 15 showing hub 404 and reclining mechanism. FIG. 16A shows the coaxial placement of timing shaft 406 and spring 604. Spring 604 is connected to the reclining mechanism inside hub 404 around timing shaft 406 by a stub shaft or other pivotable connection.

In the example shown in FIG. 16A, each spring attachment point 800 is a slot for an end of spring 604. Spring attachment points 800 in the assembly are coupled to opposite ends of spring 604 in order to set the equilibrium point of spring 604. In FIG. 16A, one spring attachment point 800 is shown as part of seat back strut 405. Another spring attachment point 800 is immobile and fixed as part of side support 402a or 402b and provides resistance against spring 604. Side back strut 405 is secured to seat back structure 410 using side back attachment apertures 802. Also in FIG. 16A, the placement of seat back bar 416 to support transit seat 10 laterally is visible.

As stated above, there is a conventional reclining mechanism that allows hub 404 and seat back strut 405 to rotate relative to each other. The motion of handle shaft 600 can control the lock within this conventional reclining mechanism which gives the passenger granular angular control. Timing shaft 406 keeps the reclining mechanism on each side of the passenger moving synchronously. Seat back bar 416 provides lateral support to protect the more delicate parts of the reclining mechanism.

Figure 16B:
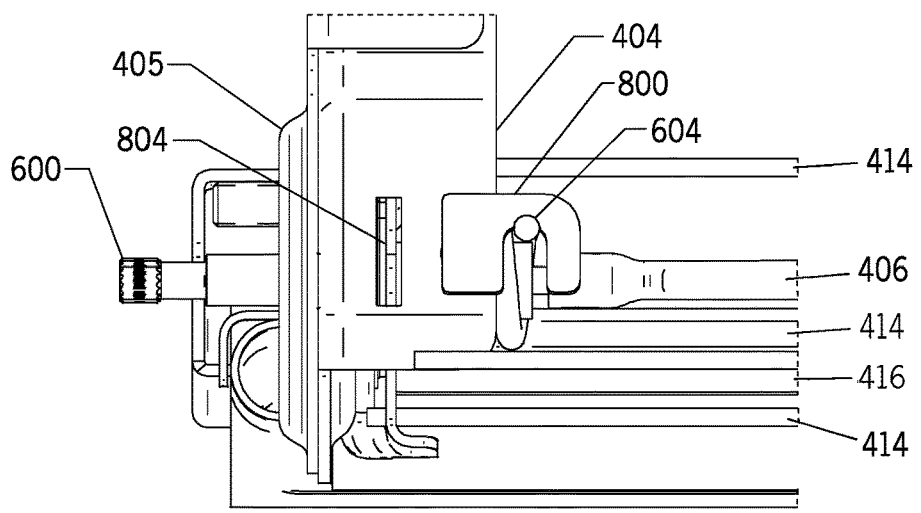
FIG. 16B is an bottom plan view of the components shown in FIG. 16A.

FIG. 16B is a view of hub 404 from below and shows the mechanism to control the limits of the conventional reclining mechanism in a crash. To limit the full range of motion, hard stop window 806 is included in strut extension 804 of hub 404 as shown in FIG. 16B. Strut extension 804 is built into seat back strut 405 and fits into hard stop window 806 and this interaction prevents unintended motion in a crash situation.

Figure 17:
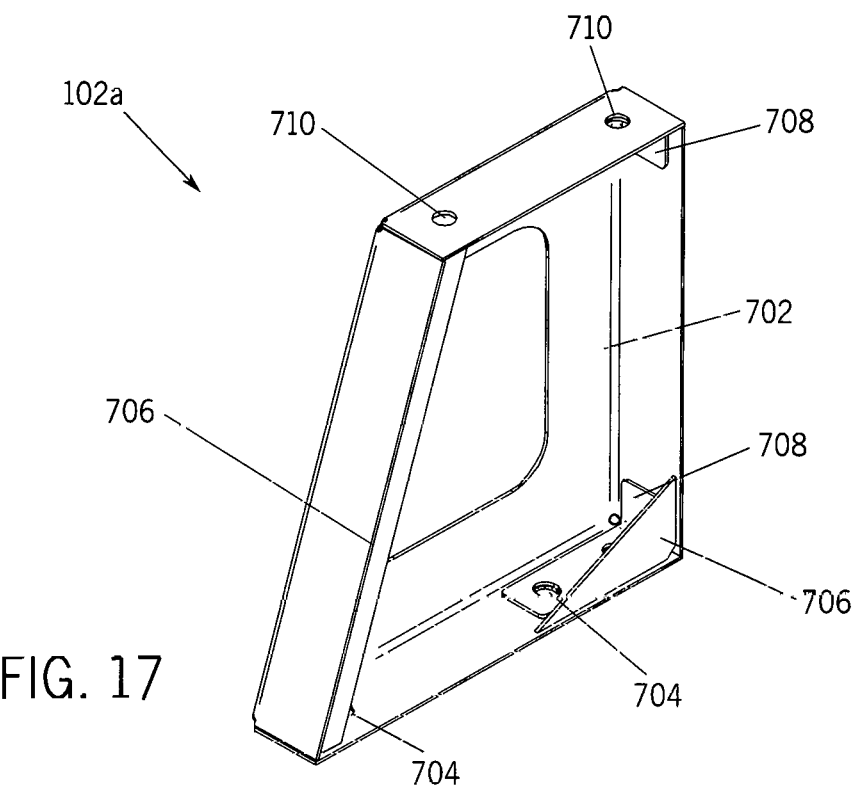
FIG. 17 is a perspective view of one example of an outer pedestal utilized in the structures shown in both FIG. 6 and FIG. 10.
Figure 18:
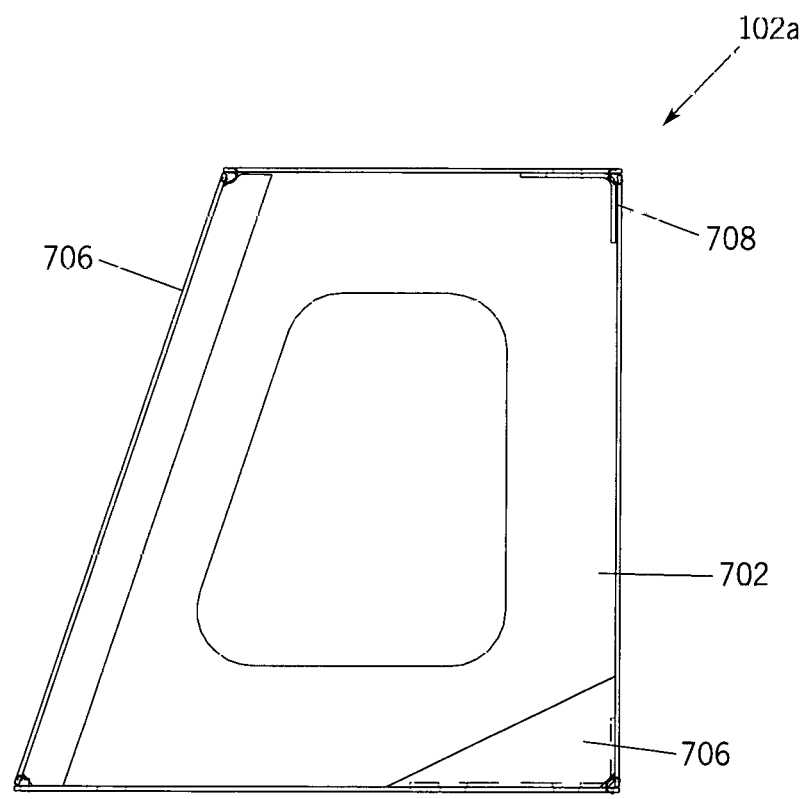
FIG. 18 is an elevated side view of the pedestal of FIG. 17.

FIGS. 17-18 show one example for the configuration of outer pedestal 102a. Pedestal 102c is symmetrical to the design of pedestal 102a about the center of transit seat 10. Inner pedestal 102b is described below in FIG. 19A-C.

In the example shown in FIG. 17, pedestal 102a is constructed of pedestal body 702 and side plates 706. Pedestal body 702 is the central structure of pedestal 102a, giving rise to its primary shape. Side plates 706 supplement, strengthen, stabilize and complete the shape defined by pedestal body 702. Side plates 706 may be integrally formed with pedestal body 702, but are shown in FIGS. 17-18 as separate pieces welded or otherwise fastened to pedestal body. Side plates 706 can be added to any corner that requires additional support.

In the example shown in FIGS. 17-18, the portions of pedestal 102a are further stabilized with brackets 708. Floor-mounting apertures 704 provide locations for inserting any suitable means of attachment for affixing pedestal 102a to the vehicle floor. Side support attachment apertures 710 likewise provide locations for inserting fasteners 411— as shown in FIG. 6—or other suitable means of attachment for affixing side support 402a on top of each pedestal 102a.

To reduce weight further, brackets 708 can simultaneously be used to strengthen and stabilize the sides of pedestal body 702 as well as to affix pedestal 102a through to the vehicle floor, using floor-mounting apertures 704. Likewise, bracket 708 at the top of pedestal 102a can be used to reinforce the connection of pedestal 102a to side support 402a, at side support attachment apertures 710. As first seen in FIG. 3B, floor bracket 302 can be attached at the rear of any pedestal to reinforce the connection to the vehicle floor.

Pedestal body 702, side plates 706 and brackets 708 may be constructed out of metal that has been stamped into shape, as shown in FIG. 17. These components could also be comprised of molded plastic or any other suitable material that can support the combined weight of the seat and its passenger. Pedestal 102*a* could be integrally formed as a single piece, or could be formed from various sheets of metal, which sheets could simply be held together using brackets 708 with mechanical fasters, or otherwise held together by chemical adhesives. The joints and seams of pedestal 102*a* could be welded, brazed, glued, or otherwise attached in addition to any primary means of joining. For example, in the sheet metal construction shown in FIG. 17, not only are the sides of pedestal body 702 held together by brackets 708, they are also reinforced with welding at every seam where an edge of pedestal body 702 touches an adjoining edge of pedestal body 702 or touches side plate 706.

The stability of the entire transit seat relies on the rigidity of the attachments to the vehicle floor. As pedestal 102*a* bears the entire weight of the assembly and the passenger, it is usually one of the heaviest parts of the transit seat. In order to further the goals of optimizing maximum strength with minimum weight, pedestal 102*a* is generally in the shape of a trapezoidal solid in the example shown in FIGS. 14-15. The interior of the solid is open or hollow, as are several of the faces of pedestal 102*a*, as can be seen in FIG. 17. By focusing material usage along edges and reinforcing stressed areas with brackets 708, the strength of pedestal 102*a* is maintained without using unnecessary material, and thus at a lower overall weight.

In FIG. 19A, the inner pedestal 102*b* is shown attached mounting plate 418. This pedestal does not have a side cut away, for weight reduction in the center of pedestal body 702, because extra strength is needed to support two passengers, together with the load bourn by mounting plate 418. The top of inner pedestal is adapted to mounting plate 418 rather than directly attaching to any of side supports 402*a*, 402*b*, 402*c*, or 402*d* by side support attachment apertures 710.

Mounting plate 418 is shown integrated with inner pedestal 102*b* in FIGS. 19A-19C. The assembly shown in FIGS. 19A-C is usually simultaneously affixed to two side supports 402*b* and 402*c*, in order to support the weight of passengers on either side. Mounting plate 418 is shown as pressed or stamped in FIG. 19B, but could be any suitable shape and composition to serve as a linkage. In the example shown, mounting plate 418 is welded to the top of inner pedestal 102*b* as discussed above. These parts could be cast or otherwise integrally formed together or simply joined with mechanical fasteners or any other conventional means of attachment, including welding. Like exterior pedestals 102*a* and 102*c*, mounting plate 418 has side support attachment apertures 710.

Figure 20A:
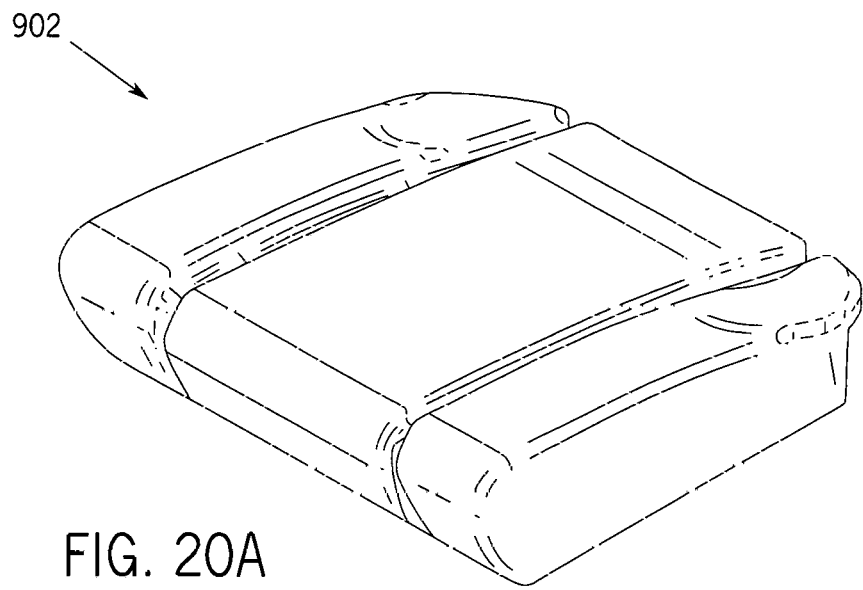
FIG. 20A is a top perspective view of a seat cushion assembly for use in the present invention.
Figure 20B:
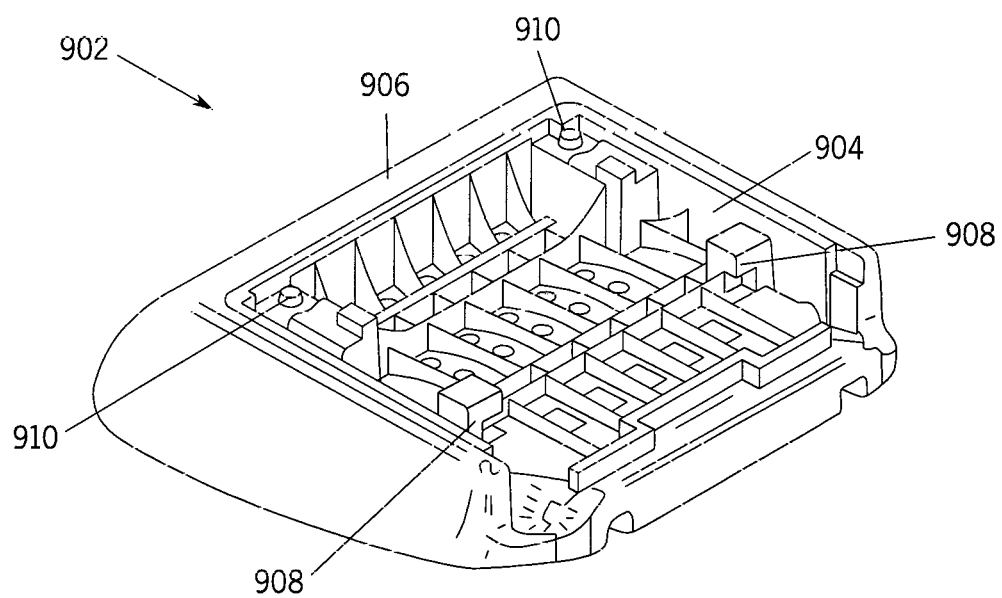
FIG. 20B is a perspective bottom view of the cushion assembly of FIG. 20A showing the internal components and attachment mechanisms.

One of cushion assemblies 902 is shown in FIGS. 20A-20B. Cushion assembly 902 is positioned in seating portion 104 and affixed to side supports 402 on either side. In FIG. 20A cushion assembly 902 is shown with seat cover 110 affixed. Cushion assembly is comprised of cushion structure 904 and cushion structure 906 as shown in FIG. 20B. In the example shown in the underside view of FIG. 20B, cushion structure 904 is shown as a structure that supports the foam of cushion padding 906.

In the example shown in FIG. 20B, cushion assembly 902 is installed using catch 908 and bullet 910. First, hooks 413 (FIG. 14) are inserted into catches 908, shown in FIG. 20B, a portion of cushion structure 904 adapted to receive hook 413. Cushion assembly 902 is rotated downward to insert bullets 910 into cushion receiving aperture 407 (FIG. 14) which flex to allow the head of bullet 910 to enter, but lock around the neck portion of bullet 910 to prevent the cushion assembly from being removed.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A transit seat for a vehicle having a vehicle floor, comprising:
    at least two pedestals affixed to the vehicle floor;
    a seat back portion;
    a cushion assembly;
    a base, wherein the base comprises
        at least two metal side supports, each metal side support being affixed to the top of one of the pedestals, and
        one or more metal crossbars for restraining the lateral positions of said metal side supports;
    said one or more metal crossbars extending between said two metal side supports at positions substantially displaced from the forwardmost portions of said side support, at positions substantially adjacent to the top of said respective pedestals,
    said pedestals, side supports, and one or more crossbars expressly excluding the orientation of one or more conventional rack frame support structures operably positioned underneath the metal side supports.

2. The transit seat of claim 1, further comprising a mounting plate and three pedestals, in which the three pedestals comprise two outer pedestals supporting the opposing ends of the transit seat, and a third, inner pedestal, and wherein the mounting plate is affixed to the third, inner pedestal and coupled to at least two side supports, forming a seat for two passengers.

3. The transit seat of claim 2, further comprising a reclining mechanism allowing the seat back portion to rotate around a fixed axis relative to the rest of the transit seat.

4. The transit seat of claim 3, in which the reclining means is resiliently biased to return to an upright position.

5. The transit seat of claim 4, in which the transit seat further comprises a torsion spring.

6. The transit seat of claim 3, in which the seat back portion further comprises a locking mechanism that prevents motion of the pivotable connection relative to the pedestals.

7. The transit seat of claim 6, in which the locking mechanism is controlled by a handle.

8. The transit seat of claim 2, in which the pedestals are structured as trapezoidal solids that are substantially hollow.

9. The transit seat of claim 2, in which the transit seat comprises a bucket-style seat.

10. The transit seat of claim 2, in which the transit seat comprises a bench-style seat.

11. The transit seat of claim 2, wherein the transit seat further comprises a seat belt.

12. The transit seat of claim 2, further comprising a seat cover.

13. The transit seat of claim 12 wherein the seat cover further comprises a plastic shell shaped to hold the user.

14. The transit seat of claim 12 wherein the seat cover comprises fabric stretched over foam padding.

15. A single transit seat for a vehicle having a vehicle floor, comprising:
- a first pedestal positioned at one end of said transit seat and a second pedestal positioned at the opposite end of said transit seat;
- a cushion assembly;
- a seat back portion including a seat cover and foam padding; and
- a base, wherein the base comprises
  - one or more crossbars for restraining the lateral positions of said metal side supports;
- a first metal side support affixed to the top of said first pedestal;
- a second metal side support affixed to the top of said second pedestal; and
- said one or more metal crossbars extending between said two metal side supports at positions substantially displaced from the forwardmost portions of said side support, at positions substantially adjacent to the top of said respective pedestals;
- said pedestals, side supports, and one or more crossbars expressly excluding the orientation of one or more conventional rack frame support structures operably positioned underneath the side supports.

16. The transit seat of claim 15 further comprising a reclining mechanism allowing the seat back portion to rotate around a fixed axis at the rear of the first and second side supports.

17. The transit seat of claim 15 wherein the seat back portion is fixed and unable to rotate relative to the first and second side supports.

18. A double transit seat for a vehicle having a vehicle floor, comprising:
- a first pedestal positioned at one end of said transit seat, a second pedestal positioned at the opposite end of said transit seat, and a third pedestal positioned in the center of said transit seat
- a cushion assembly;
- a seat back portion including a seat cover and foam padding; and
- a base, wherein the base comprises
  - one or more crossbars for restraining the lateral positions of said metal side supports;
- a first metal side support affixed to the top of said first pedestal;
- a second metal side support affixed to the top of said second pedestal; and
- a third metal side support and a fourth metal side support, wherein said third metal side support and said fourth metal side support are affixed on top of a mounting plate, and wherein said mounting plate is affixed on top of said third pedestal,
- said one or more metal crossbars extending between said two metal side supports at positions substantially displaced from the forwardmost portions of said side support, at positions substantially adjacent to the top of said respective pedestals;
- said pedestals, side supports, and one or more crossbars expressly excluding the orientation of one or more conventional rack frame support structures operably positioned underneath the side supports.

19. The transit seat of claim 18 further comprising a reclining mechanism allowing the seat back portion to rotate around a fixed axis at the rear of the first and second side supports.

20. The transit seat of claim 18 wherein the seat back portion is fixed and unable to rotate relative to the first and second side supports.

* * * * *